United States Patent
Rodriguez et al.

(10) Patent No.: US 9,561,752 B2
(45) Date of Patent: Feb. 7, 2017

(54) ORBITING PLATFORM STORAGE SYSTEM FOR A VEHICLE

(71) Applicant: FORD GLOBAL TECHNOLOGIES, LLC, Dearborn, MI (US)

(72) Inventors: Elliot Moises Espinosa Rodriguez, Mexico City (MX); Ricardo Ignacio Medina Rodriguez, Mexico City (MX); Francisco Javier Villanueva, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 14/508,131

(22) Filed: Oct. 7, 2014

(65) Prior Publication Data

US 2016/0096480 A1 Apr. 7, 2016

(51) Int. Cl.
*B60R 7/00* (2006.01)
*B60R 7/02* (2006.01)
*B60R 5/04* (2006.01)

(52) U.S. Cl.
CPC .. *B60R 7/02* (2013.01); *B60R 5/04* (2013.01)

(58) Field of Classification Search
CPC ..................................... B60R 7/08; B60R 7/04
USPC ............... 296/37.1, 37.2, 37.6, 37.16, 37.14
See application file for complete search history.

(56) References Cited

U.S. PATENT DOCUMENTS

| 2,568,628 | A | 9/1951 | Herring |
| 6,338,518 | B1 | 1/2002 | D'Annunzio et al. |
| 8,002,323 | B2 * | 8/2011 | Jones ........................ B60R 7/04 296/24.34 |
| 8,177,110 | B1 * | 5/2012 | Hines, Jr. .................. B60R 9/00 224/403 |

FOREIGN PATENT DOCUMENTS

| DE | 102004034072 A1 | 2/2006 |
| DE | 102012010337 A1 | 11/2013 |
| SU | 1028461 A1 | 7/1983 |
| WO | 01/49528 A1 | 7/2001 |

OTHER PUBLICATIONS

English Machine translation of DE102004034072.
English Machine translation of DE102012010337.
English Machine translation of SU1028461.
BMW Group Trunk Idea Contest; "Rotatable Floor"; printed on Jul. 31, 2014, 1 page; https://trunk-contest.bmwgroup-cocreationlab.com/profile/index/mode/idea-details/ideald/576.
BMW Group Trunk Idea Contest; "Rotating Trunk Floor"; printed on Jul. 31, 2014, 1 page; https://trunk-contest.bmwgroup-cocreationlab.com/profile/index/mode/idea-details/ideald/254.

* cited by examiner

*Primary Examiner* — Joseph D Pape
(74) *Attorney, Agent, or Firm* — Vichit Chea; King & Schickli, PLLC

(57) ABSTRACT

A storage system is provided for a vehicle. The storage system comprises a base including a guideway and a follower received in the guideway. Further the storage system includes a platform that is carried on the follower. The platform is displaceable along an orbital path of movement to allow improved access to various portions of the storage area.

15 Claims, 7 Drawing Sheets

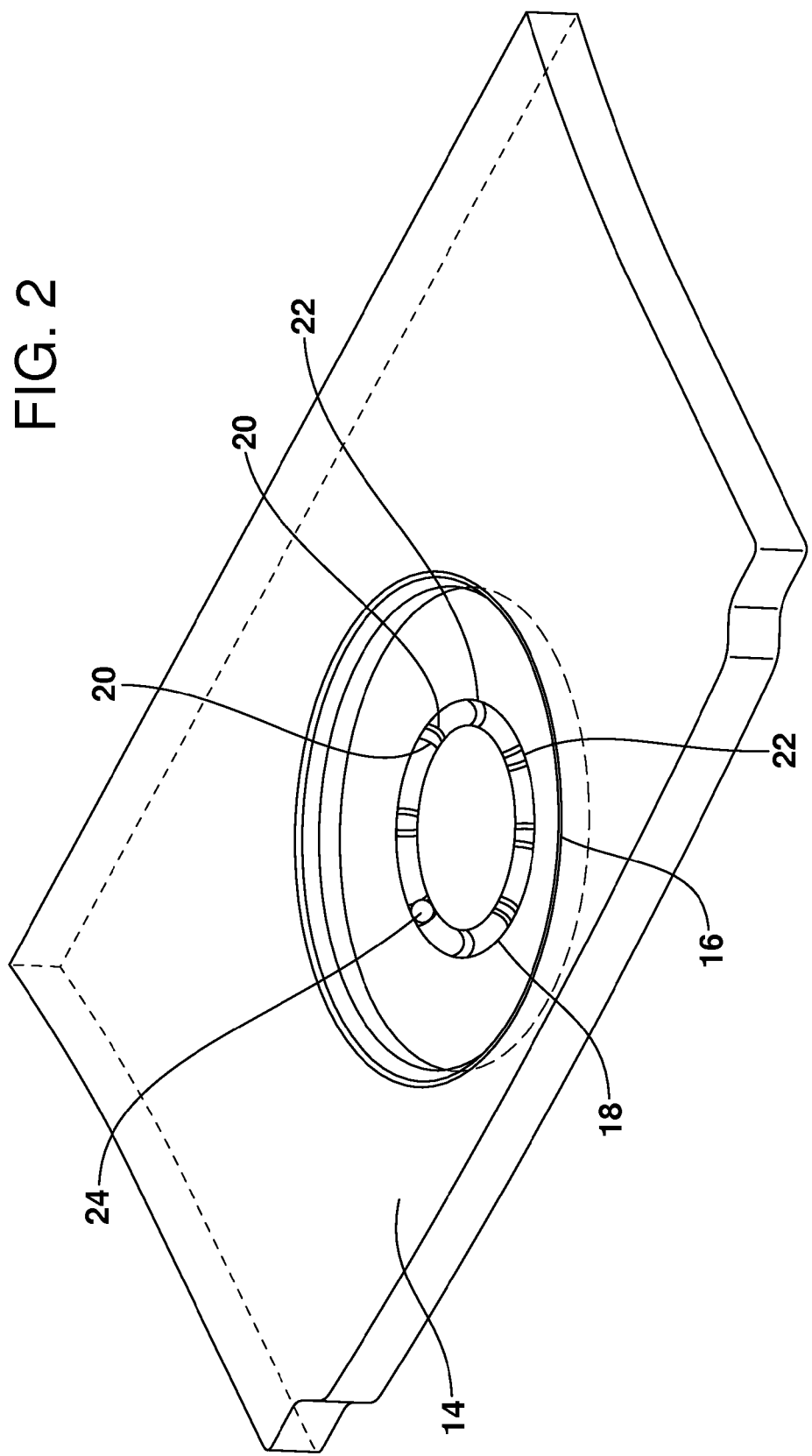

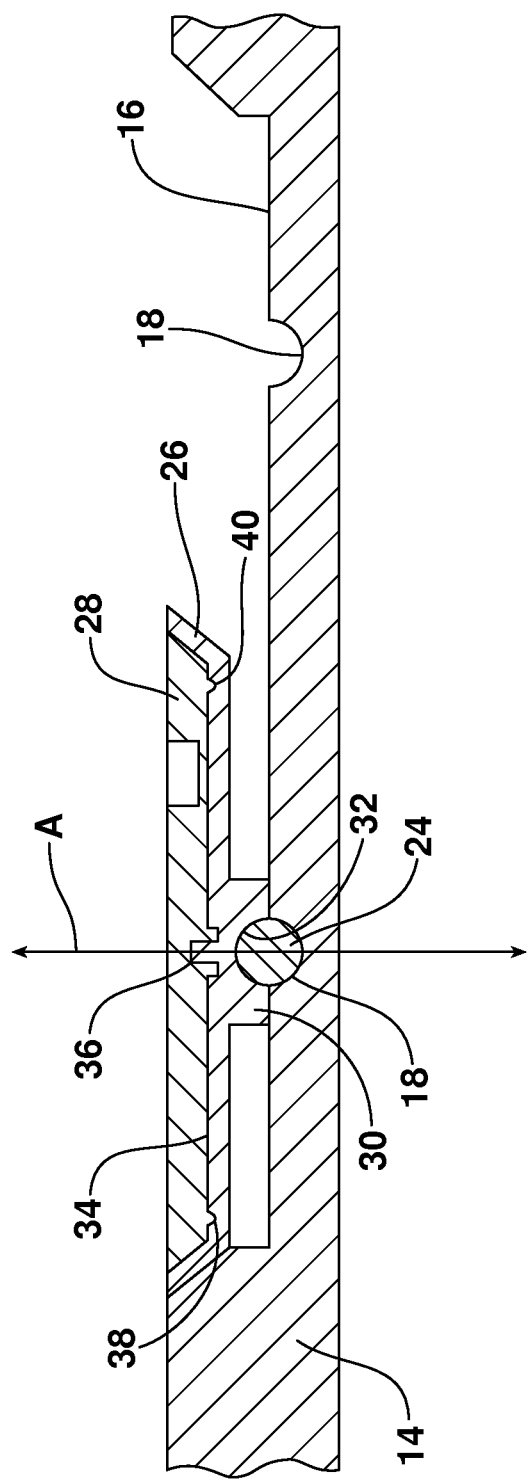

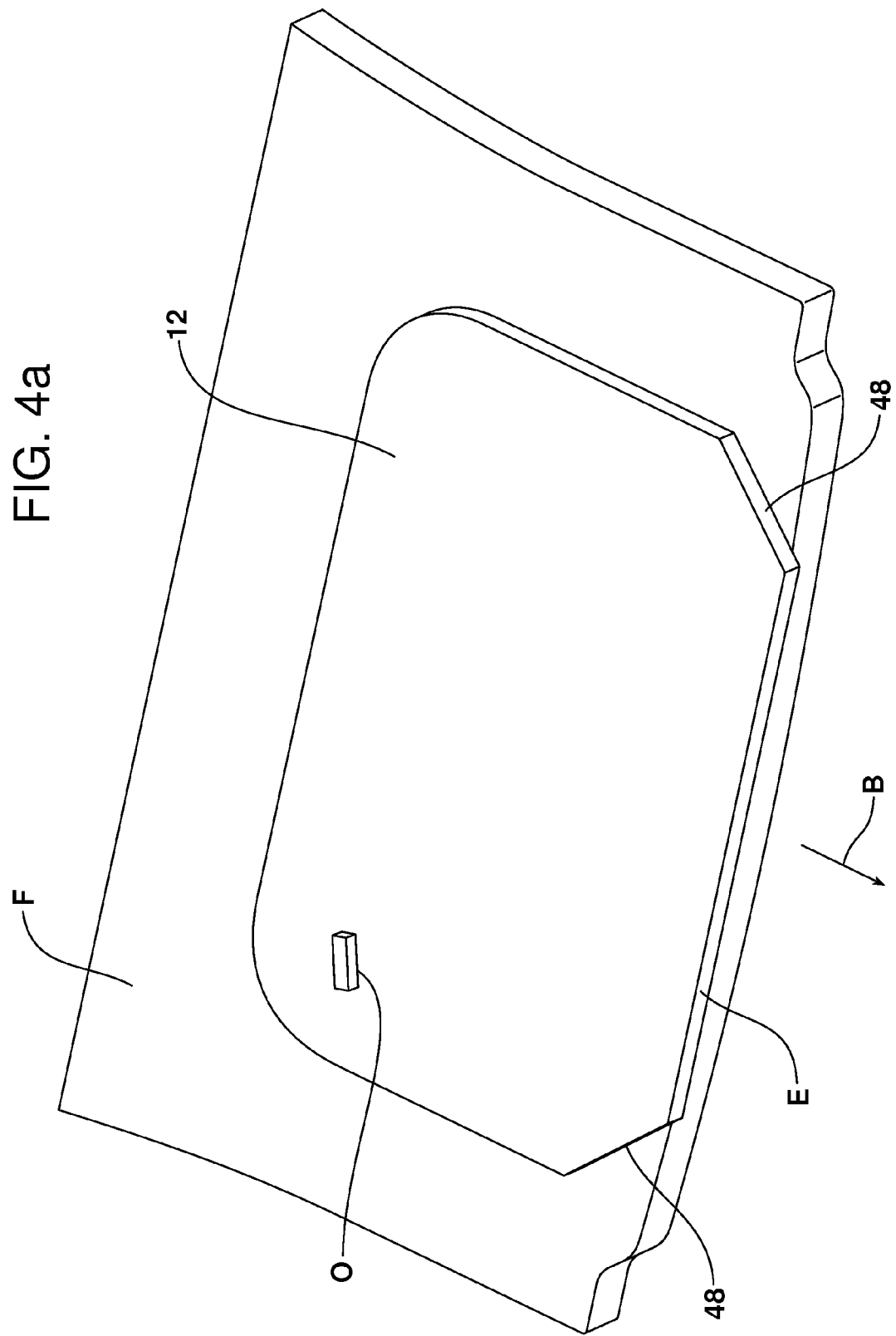

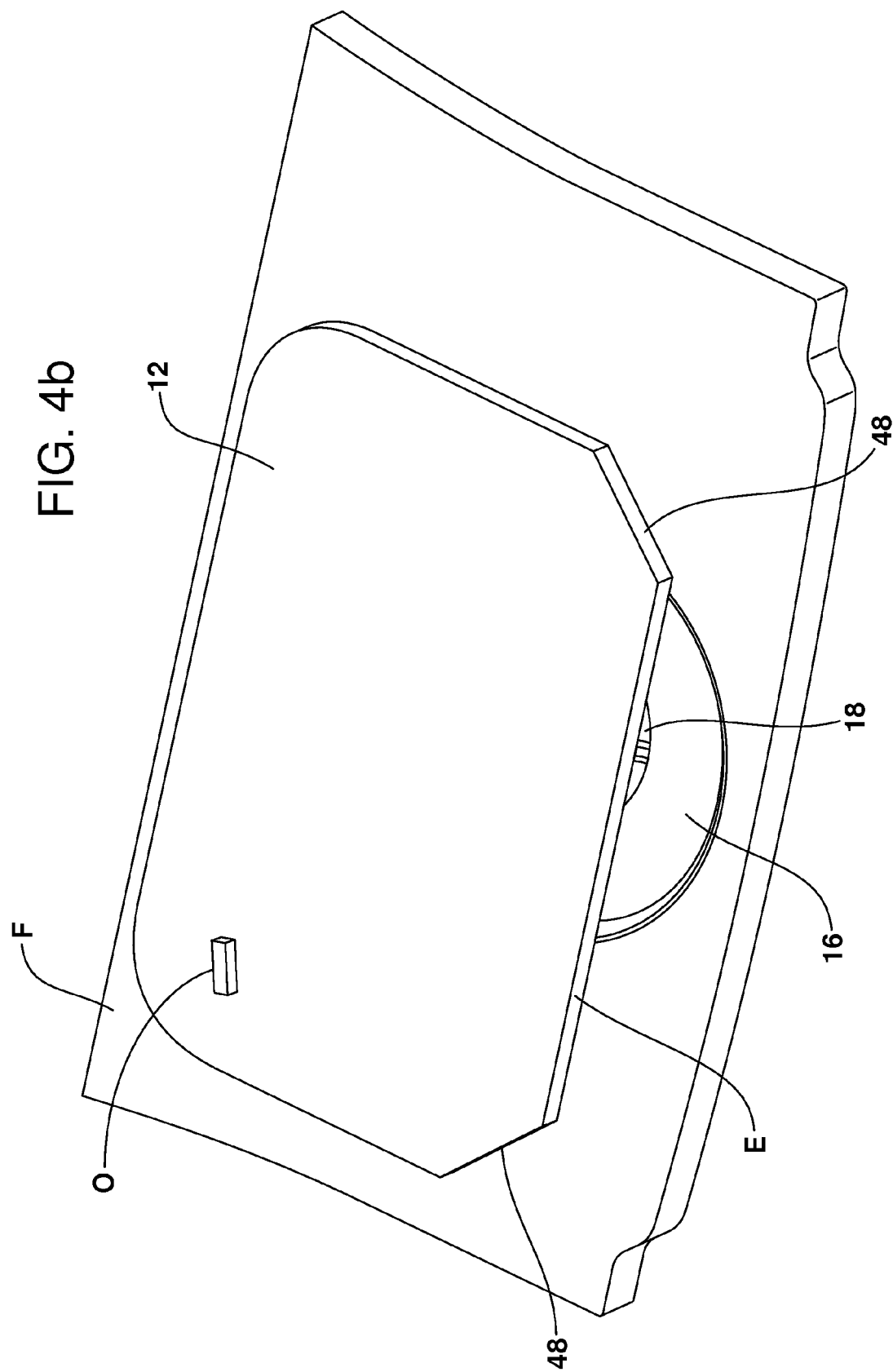

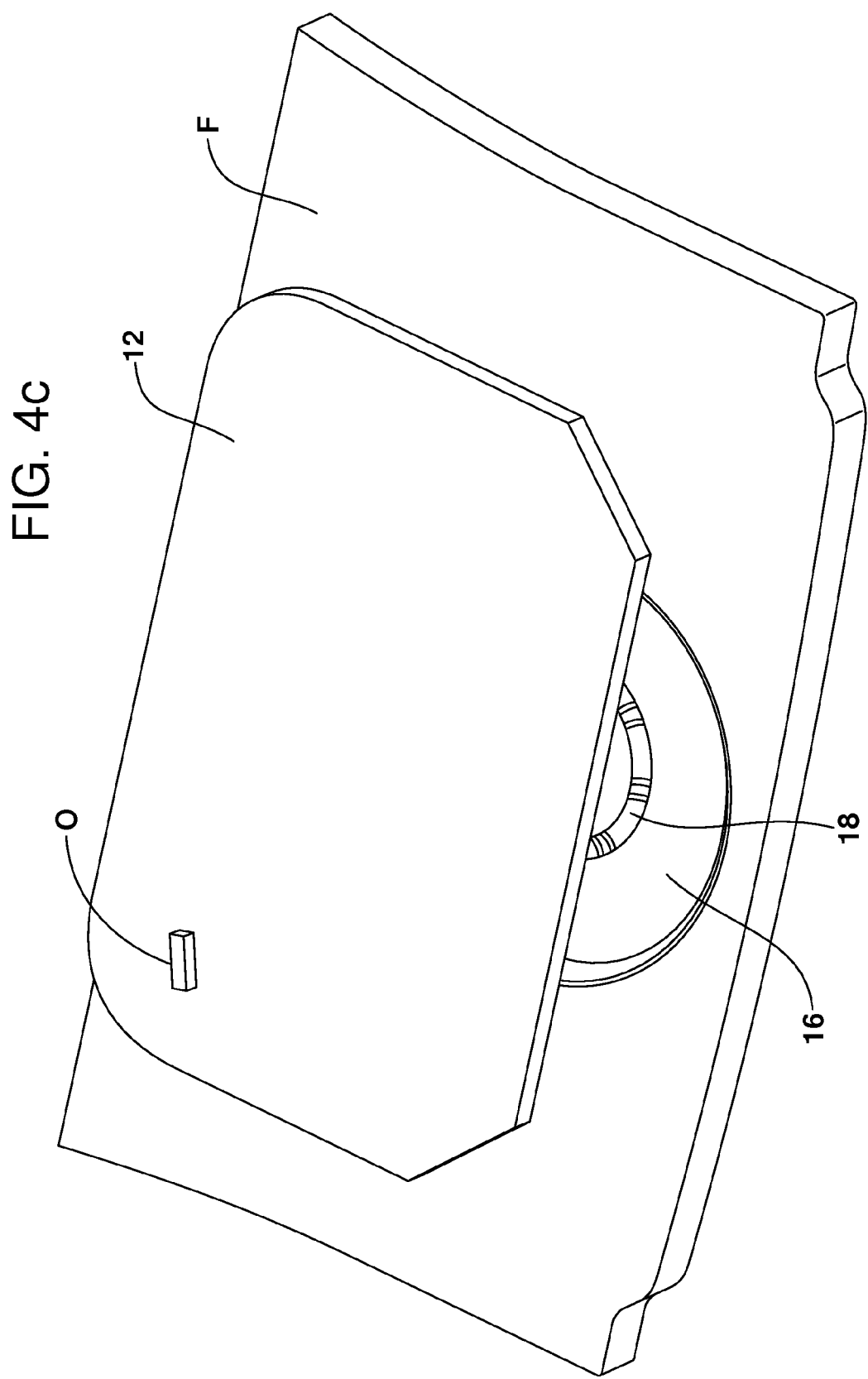

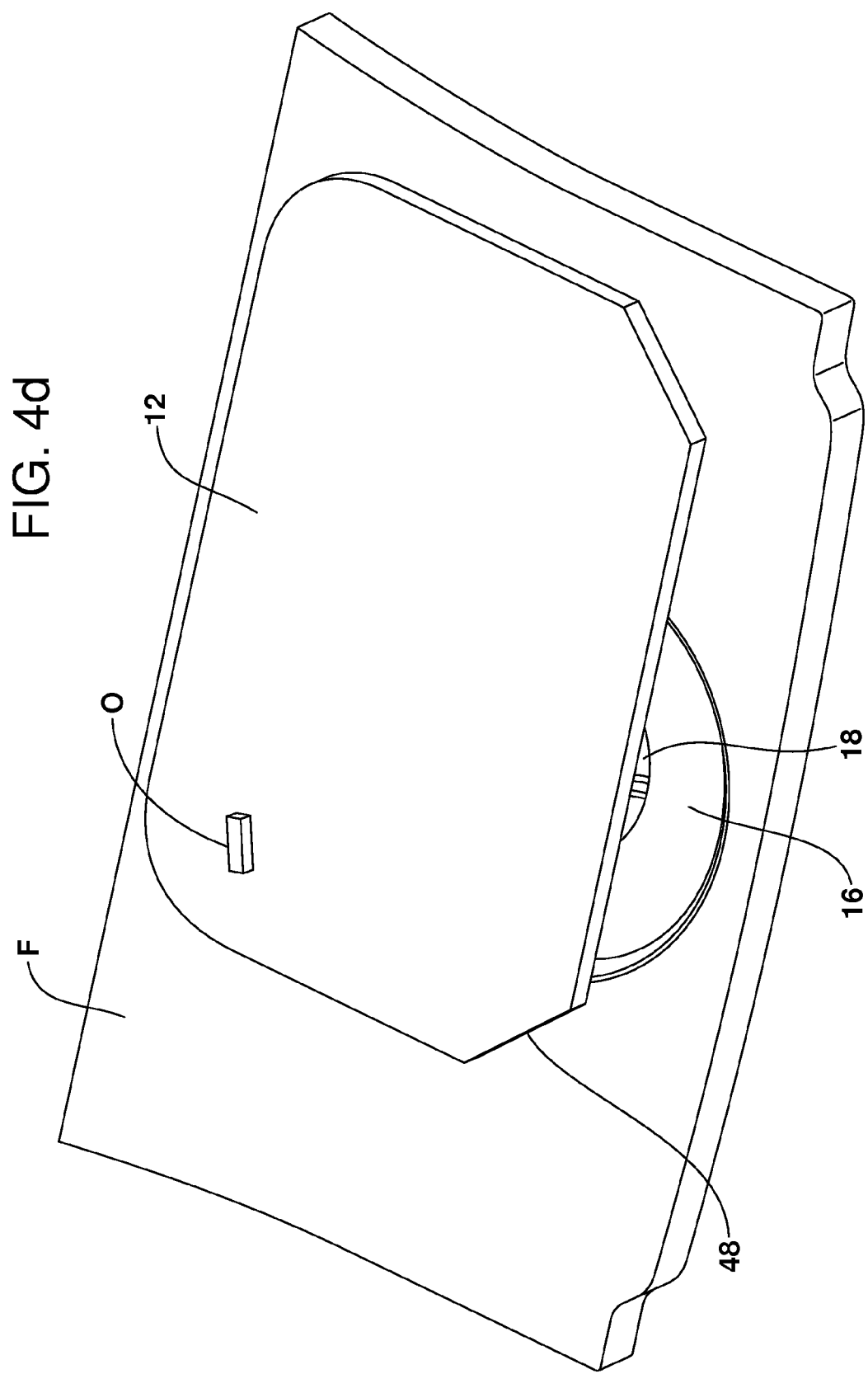

ORBITING PLATFORM STORAGE SYSTEM FOR A VEHICLE

TECHNICAL FIELD

This document relates generally to the vehicle equipment field and, more particularly, to a storage system for a vehicle that incorporates an orbiting platform that makes storage areas of the vehicle more accessible and useful.

BACKGROUND

Motor vehicles are often equipped with large storage areas that are useful to store luggage or other objects. This is true whether the vehicle is a sedan with a trunk compartment under the trunk lid, a sport-utility vehicle with a storage space behind the rear seat accessed by means of a tailgate or a hatchback vehicle with a storage area underneath the hatchback. In many of these vehicles, the size of the storage area prevents one at the rear of the vehicle from easily accessing the forward portion of the storage area which is out of reach.

U.S. Pat. No. 2,568,628 discloses a rotary platform that is mounted to the floor of a trunk 80 and makes the forwardmost area of the storage space more accessible to one at the rear of the vehicle. More specifically, any object held on the platform at the front of the storage space may be conveniently moved toward the individual at the rear of the vehicle by simply rotating the platform.

While such a rotating platform is useful for its intended purpose, it should be appreciated that such a platform only improves access to that portion of the forward storage space in the middle of the vehicle. The forwardmost corners of the storage space to the right and left of the platform essentially remain unreachable and largely inaccessible to someone at the rear of the vehicle.

This document relates to a new and improved storage system for a vehicle that incorporates an orbiting platform that provides much better access to the forwardmost portions of the storage compartment for one at the rear of the vehicle. This includes better access to objects stored at the forwardmost corners of the storage area. Accordingly, the storage system disclosed in this document represents a significant advance in the art when compared to a rotatable tray or platform as disclosed in U.S. Pat. No. 2,568,628.

SUMMARY

In accordance with the purposes and benefits described herein, a storage system is provided for a vehicle. The storage system includes an orbiting platform carried on a floor of the vehicle. More specifically the storage platform includes a displaceable axis about which the orbiting platform pivots.

In accordance with an additional aspect, a storage system for a vehicle comprises a base including a guideway, a follower engaging the guideway, and a platform carried on the follower and displaceable along an orbital path of movement. In one possible embodiment, the system further includes a support plate including a receiver and a rotating plate received in that receiver.

In one possible embodiment, the follower comprises a sphere which may be made of rubber. Further the guideway is a continuous groove. That groove may form an endless circle and incorporate a round bottom wall. Further the guideway may include a series of protuberances extending into the groove.

In one possible embodiment, the receiver is a cavity and the rotating plate rotates in that cavity. In one possible embodiment, the support plate includes a hub that is received over the sphere. Further the rotating plate may include a plurality of indexing apertures. The platform may also include a plurality of lugs that are aligned with and received in the plurality of indexing apertures whereby the platform is held on the rotating plate.

In accordance with yet another aspect, a method is provided for improving access to the objects stored in a vehicle. The method may be broadly described as comprising the step of equipping the vehicle with an orbiting platform that is displaceable along an orbiting path across a floor of the vehicle whereby an object resting on the platform may be moved from a difficult to access location to a readily accessed location.

In the following description, there are shown and described several preferred embodiments of the storage system. As it should be realized, the storage system is capable of other, different embodiments and its several details are capable of modification in various, obvious aspects all without departing from the storage system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the storage system and together with the description serve to explain certain principles thereof. In the drawing:

FIG. 2 is a perspective view illustrating how the sphere is received in the guideway of the base.

FIG. 3 is a cross-sectional view illustrating how the support plate is received on the sphere in the guideway and how the rotating plate is received in the receiver of the support plate.

FIGS. 4a-4d illustrate, respectively, the rearmost center, left forwardmost, forwardmost center and right forwardmost positions of the orbital platform.

Figure 1:
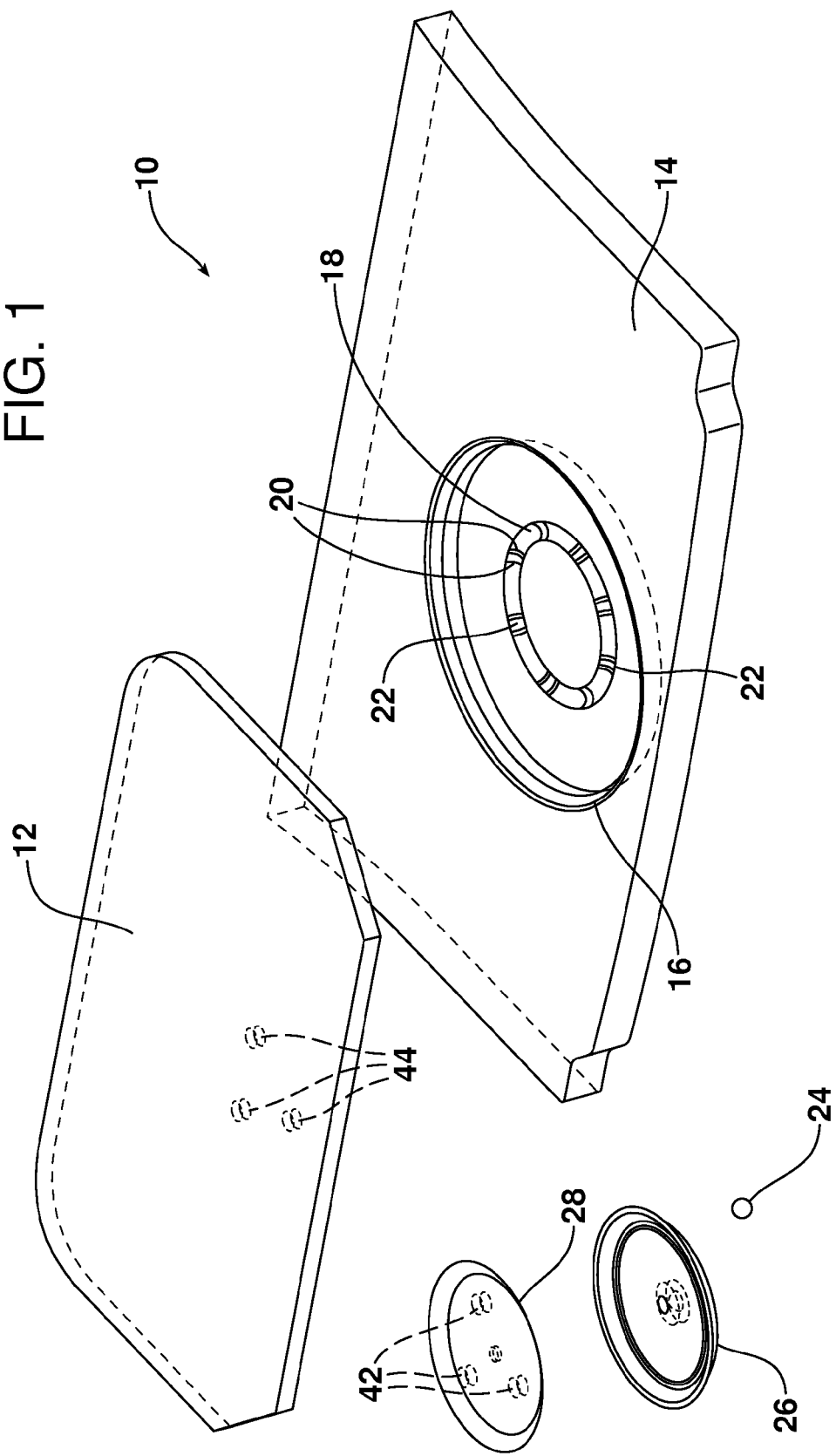
FIG. 1 is an exploded perspective view of the storage system.

Reference will now be made in detail to the present preferred embodiments of the storage system, examples of which are illustrated in the accompanying drawing figures.

DETAILED DESCRIPTION

Reference is now made to FIGS. 1-4d illustrating the storage system 10. As broadly described the storage system 10 includes an orbiting platform 12 that is carried on the floor F of the vehicle. As will be described in greater detail below, the orbiting platform 12 includes a displaceable axis A about which the orbiting platform pivots.

More specifically, the storage system 10 includes a base 14 having a circular recess 16. A guideway or guide track 18 is concentrically received in the recess 16. In the illustrated embodiment the guideway 18 is a continuous groove and, more particularly, a continuous, circular groove incorporating a round bottom. As further illustrated the guideway 18 includes a series of protuberances 20 that extend into the groove. More specifically, the protuberances 20 include paired sets of protuberances 22 provided at various angular positions around the guideway 18. Eight pair of protuberances 22 are illustrated in FIG. 1. As will be appreciated from the following description, each of the paired sets 22 of protuberances defines a different angular position in which the orbiting platform 12 may be held. As further illustrated in FIGS. 1, 2 and 3, the storage system 10 includes a follower 24 that is received in and rolls along the guideway 18. In one possible embodiment the follower 24 comprises a sphere that may, for example, be made from rubber material. Each set of protuberances 22 defines a notch or gap therebetween that is sized to the sphere/follower 24 and thereby tends to hold the sphere/follower in that position.

Still further, the storage system 10 includes a support plate 26 and a rotating plate 28. As illustrated best in FIG. 3, the support plate 26 includes a hub 30 having a socket 32 sized and shaped to receive and rotatably rest on the follower 24. Further, the support plate 26 includes a circular recess 34. The rotating plate 28 is received and held in the recess 34. The rotating plate 28 rotates relative to the support plate 26 in the recess 34 on the stub shaft 36. During rotation, the spaced projections 38 on the rotating plate 28 travel along the circular channel 40 in the support plate 26.

As further illustrated, the rotating plate 28 includes a plurality of indexing apertures 42. While three are illustrated in the drawing figures, it should be appreciated that 2-6 or more may be provided. As further illustrated, the orbiting platform 12 includes a plurality of lugs that project from the rear or lower face thereof. The lugs 44 are aligned with and received in the plurality of apertures 42 in order to connect the orbiting platform 12 to the rotating plate 28. As a consequence of this connection, it should be appreciated that the platform 12 pivots with the rotating plate 28 about a pivot axis A that passes through the stub shaft 36 and the sphere/follower 24. Further, it should be appreciated that the stub shaft 36, the sphere/follower 24 and, accordingly, the axis A move around an orbiting path defined by the guideway 18 formed in the recess 16 of the base 14.

As best illustrated in FIGS. 4a-4d, the orbiting platform 12 of the storage system 10 may be displaced along an orbiting path across the floor F of the vehicle from the rearmost center position (FIG. 4a), to the left forwardmost position (FIG. 4b), the forwardmost center position (FIG. 4c), the right forwardmost position (FIG. 4d) and then back to the rearmost center position (FIG. 4a). More specifically, the user may place an object O in any desired position on top of the storage platform 12. In the embodiment illustrated in FIGS. 4a-4d, that object is positioned at the left forward most quadrant of the orbiting platform 12. The user may then engage the surface of the platform 12 with his hands or fingers and apply pressure to shift the platform from the rearmost centered position illustrated in FIG. 4a to the left forwardmost position illustrated in FIG. 4b thereby placing the object in what would otherwise be a difficult to access position at the left forwardmost corner of the storage compartment. The orbiting platform 12 is held in this position by one of the paired sets of protuberances 22 which engage and tend to hold the follower 24 in the corresponding position during operation of the vehicle and travel from one location to another.

Upon reaching the desired destination, the operator opens the hatchback lid, trunk lid or tailgate to access the storage compartment. The operator then engages the surface of the orbiting platform 12 with his hands or fingers and applies the necessary pressure to cause the follower 24 to roll past the paired set of protuberances 22 and move the orbiting platform clockwise or counterclockwise from the left forwardmost position illustrated in FIG. 4b to the rearmost centered position illustrated in FIG. 4a so as to provide better access to the object O. Upon reaching the rearmost centered position, it should be appreciated that the follower 24 is received in a different paired set of protuberances 22 which tend to maintain the orbiting platform in the rearmost centered position.

While the platform 12 is illustrated in FIGS. 4a-4d with the same edge E oriented toward the rear of the vehicle in each figure, it should be appreciated that the platform may be rotated on the stub shaft 36 about the axis A into other orientations if desired by the operator. The illustration in FIGS. 4a-4d are all presented with the platform 12 in the same axial orientation so as to better illustrate the orbiting motion of the platform.

In summary, numerous benefits result from use of the storage system 10. Advantageously, the orbiting platform 12 allows one to more efficiently and conveniently utilize the storage space of the vehicle including the forwardmost corners of the storage space that would otherwise be difficult to access from the rear of the vehicle. Advantageously, the orbiting platform 12 rides on the rotating plate 28 which rotates in the support plate 26 and, if desired, may always be oriented with the rearmost edge E of the platform directed toward the rear of the vehicle (note action arrow B in FIGS. 4a-4d). In the illustrated embodiment the orbiting platform 12 also includes truncated rear corners 48 so as to provide the necessary clearance to allow the orbiting platform to be displaced a full 360° around the storage area without interfering with the rear side wall of the storage area.

Significantly the follower 24 upon which the support plate rides moves freely along in the guideway 18 between the paired sets of protuberances 22. However, each paired set of protuberances provides spaced angular positions that tend to hold the orbiting platform 12 in place during vehicle operation thereby preventing it from free, undesired movement at such times.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A storage system for a vehicle, comprising:
a base including a circular guideway;
a follower received in said guideway; and
a platform carried on said follower and displaceable along an orbital path of movement.

2. The system of claim 1, further including a support plate including a receiver, said support plate rotatably rests on the follower.

3. The system of claim 2, further including a rotating plate received in said receiver.

4. The system of claim 3, wherein said follower is a sphere.

5. The system of claim 4, wherein said sphere is made from rubber.

6. The system of claim 5, wherein said guideway is a continuous groove.

7. The system of claim 5, wherein said guideway is a continuous, circular, round-bottomed groove.

8. The system of claim 7, wherein said guideway includes a series of protuberances extending into said groove.

9. The system of claim 8, wherein said series of protuberances are provided in paired sets wherein each paired set defines a notch and a set location for positioning said platform.

10. The system of claim 9, wherein said receiver is a cavity and said rotating plate rotates in said cavity.

11. The system of claim 10, wherein said support plate includes a hub that is received over said sphere.

12. The system of claim 11, wherein said rotating plate includes a plurality of indexing apertures.

13. The system of claim 12, wherein said platform includes a plurality of lugs that are aligned with and received in said plurality of apertures whereby said platform is held on said rotating plate.

14. A method for improving access to an object stored in a vehicle, comprising:
 equipping the vehicle with an orbiting platform held in a continuous, circular groove that is displaceable along an orbiting path across a floor of the vehicle whereby an object resting on said platform may be moved from a difficult to access location to a readily accessed location.

15. A storage system for a vehicle, comprising:
 a base including a guideway;
 a follower received in said guideway;
 a support plate including a receiver, said support plate rotatably rests on the follower;
 a rotating plate received in said receiver; and
 a platform carried on said follower and displaceable along an orbital path of movement.

* * * * *